United States Patent
Török et al.

(10) Patent No.: US 12,025,439 B2
(45) Date of Patent: Jul. 2, 2024

(54) SURVEYING APPARATUS COMPRISING EVENT-BASED CAMERA

(71) Applicant: LEICA GEOSYSTEMS AG, Heerbrugg (CH)

(72) Inventors: Zoltán Török, Berneck (CH); Stefan Martin Benjamin Gächter Toya, St. Gallen (CH); Thomas Mörwald, Bregenz (AT); Ulrich Hornung, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 656 days.

(21) Appl. No.: 16/781,906

(22) Filed: Feb. 4, 2020

(65) Prior Publication Data
US 2020/0249017 A1    Aug. 6, 2020

(30) Foreign Application Priority Data
Feb. 5, 2019    (EP) .................................. 19155545

(51) Int. Cl.
*G01C 3/08*    (2006.01)
*G01B 11/00*    (2006.01)
(Continued)

(52) U.S. Cl.
CPC .............. *G01C 1/04* (2013.01); *G01B 11/005* (2013.01); *G01C 3/08* (2013.01); *G01C 11/02* (2013.01);
(Continued)

(58) Field of Classification Search
CPC . G01C 11/02; G01C 1/04; G01C 3/08; G01C 15/002; G01C 15/008; G01C 15/00;
(Continued)

(56) References Cited

U.S. PATENT DOCUMENTS 7,583,373 B2    9/2009    Schwarz
9,846,035 B2    12/2017    Kotzur et al.
(Continued)

FOREIGN PATENT DOCUMENTS

CN    105699983 A    6/2016
CN    105937904 A    9/2016
(Continued)

OTHER PUBLICATIONS

Mueggler et al, The event-camera dataset and simulator: Event-based data for pose estimation, visual odometry, and SLAM, 2017, International J of Robotics Research, 36(2): pp. 1-12 (Year: 2017).*
(Continued)

*Primary Examiner* — John Villecco
*Assistant Examiner* — Kathleen M Broughton
(74) *Attorney, Agent, or Firm* — Maschoff Brennan

(57) ABSTRACT

Surveying apparatus comprising an event-based camera comprising a dynamic vision sensor. The events detected by the camera are used, by means of target radiation, to determine a direction to a target to be surveyed or to determine camera poses of the camera in the context of visual odometry or determining the location of the surveying apparatus

6 Claims, 4 Drawing Sheets

(51) Int. Cl.
  *G01C 1/04* (2006.01)
  *G01C 11/02* (2006.01)
  *G01C 15/00* (2006.01)
  *G01S 17/89* (2020.01)
  *G06V 20/10* (2022.01)
  *G06V 20/64* (2022.01)
  *H04N 7/18* (2006.01)

(52) U.S. Cl.
  CPC ......... *G01C 15/002* (2013.01); *G01C 15/008* (2013.01); *G01S 17/89* (2013.01); *G06V 20/10* (2022.01); *G06V 20/64* (2022.01); *H04N 7/188* (2013.01); *G06V 2201/07* (2022.01)

(58) Field of Classification Search
  CPC ......... G01C 3/02; G01B 11/005; G01S 17/89; G06V 10/145; G06V 20/10; G06V 20/64; G06V 2201/07; H04N 7/188
  See application file for complete search history.

(56) References Cited

U.S. PATENT DOCUMENTS

| | | | |
|---|---|---|---|
| 10,183,541 B2 * | 1/2019 | Van Den Bossche | G01S 17/931 |
| 10,445,924 B2 | 10/2019 | Shi et al. | |
| 10,510,160 B2 | 12/2019 | Ji et al. | |
| 10,535,148 B2 | 1/2020 | Metzler et al. | |
| 10,725,179 B2 | 7/2020 | Böckem et al. | |
| 10,728,450 B2 | 7/2020 | Govil et al. | |
| 2010/0296075 A1 * | 11/2010 | Hinderling | G01S 7/4972 356/3 |
| 2012/0175496 A1 | 7/2012 | Vorovitchik | |
| 2016/0258752 A1 * | 9/2016 | Hornung | G01S 17/42 |
| 2017/0003121 A1 | 1/2017 | Brandli et al. | |
| 2017/0091922 A1 * | 3/2017 | Siercks | H04N 23/635 |
| 2017/0213105 A1 * | 7/2017 | Ji | G06V 20/49 |
| 2018/0099744 A1 | 4/2018 | Böckem et al. | |
| 2018/0137673 A1 | 5/2018 | Shi et al. | |
| 2018/0158200 A1 * | 6/2018 | Metzler | G01C 15/00 |
| 2018/0321031 A1 * | 11/2018 | Baskin | G01C 3/08 |
| 2018/0335521 A1 * | 11/2018 | Coddington | G01S 7/4808 |
| 2019/0018117 A1 | 1/2019 | Perenzoni et al. | |

FOREIGN PATENT DOCUMENTS

| | | | | |
|---|---|---|---|---|
| CN | 106289106 A | | 1/2017 | |
| CN | 106462976 A | * | 2/2017 | ........... G06T 1/0007 |
| CN | 106597463 A | | 4/2017 | |
| CN | 106705965 A | | 5/2017 | |
| CN | 106716441 A | | 5/2017 | |
| CN | 107238727 A | | 10/2017 | |
| CN | 107941204 A | | 4/2018 | |
| CN | 108073857 A | | 5/2018 | |
| CN | 108171733 A | | 6/2018 | |
| CN | 108205679 A | | 6/2018 | |
| CN | 109146929 A | | 1/2019 | |
| CN | 109215063 A | | 1/2019 | |
| EP | 1 686 350 A1 | | 8/2006 | |
| EP | 2 405 236 A1 | | 1/2012 | |
| EP | 3333538 A1 | * | 6/2018 | ........... G01B 11/005 |
| WO | 1997/10517 A1 | | 3/1997 | |
| WO | 2007/124010 A2 | | 11/2007 | |
| WO | 2011/098131 A1 | | 8/2011 | |
| WO | WO-2016012624 A1 | * | 1/2016 | ......... G06K 9/00711 |
| WO | WO-2017114577 A1 | * | 7/2017 | ............... G01C 1/02 |
| WO | WO-2018219931 A1 | * | 12/2018 | ............. G06T 7/223 |

OTHER PUBLICATIONS

Mueggler et al, Continuous-Time Visual-Inertial Odometry for Event Cameras, 2018, IEEE Transactions on Robotics, pp. 1-15. (Year: 2018).*

Brandili et al, Adaptive pulsed laser line extraction for terrain reconstruction using a dynamic vision sensor, 2014, frontiers in Neuroscience, 7. pp 1-9. (Year: 2014).*

Kirschner, H. and Stempfhuber, W., "The Kinematic Potential of Modern Tracking Total Stations—A State of the Art Report on the Leica TPS1200+," Proceedings of the 1st International Conference on Machine Control & Guidance, pp. 51-60 (2008).

European Search Report dated Dec. 2, 2019 as received in Application No. 19155545.7.

CN Notice of Allowance Dated Aug. 29, 2022 as received in Application No. 202010080262.9.

* cited by examiner

SURVEYING APPARATUS COMPRISING EVENT-BASED CAMERA

CROSS-REFERENCE TO RELATED APPLICATIONS

This application claims priority to European Patent Application No. 19155545.7 filed on Feb. 5, 2019, which is incorporated herein by reference.

FIELD OF THE INVENTION

Background

The invention relates to a surveying apparatus comprising an event-based camera according to the preamble of claim 1 or 8, and to a method according to claim 4, 7 or 14 for such a surveying apparatus.

Numerous surveying apparatuses are known for surveying one or more target points. Generally known modern examples of such surveying apparatuses are laser trackers, that is to say measuring apparatuses configured for a continuous tracking of a target point and a coordinative position determination of this point, or surveying apparatuses specifically tailored to geodetic surveys, such as laser scanners, tachymeters and total stations. The latter are also referred to as an electronic tachymeter or a computer tachymeter and comprise a series of different subsystems for fulfilling the surveying tasks in a highly automatic or automated manner. One geodetic surveying apparatus from the prior art is described for example in EP 1686350. In this case, distance and direction or horizontal and vertical angles of a surveying apparatus, the absolute position of which is known, with respect to the target point to be surveyed are recorded as spatial standard data.

In many applications, points are surveyed by specially configured targets being positioned there or being mounted on a movable vehicle. Said targets consist for example of a plumb staff with a retroreflector (e.g. an all-round prism) for defining the measurement path or the measurement point. However, surveying systems that operate without a reflector are also possible, such as are described for example in the European patent application having the application number EP 10168771.3. Surveying apparatuses having a GNSS receiver for position determination are also known.

The accuracies required during surveying for example in road or tunnel construction are in the millimeters range even over large distances between surveying apparatus and target point (so-called far field) of approximately 100 meters or more with correspondingly stringent requirements made of the surveying apparatus and, if appropriate, the retroreflective target used to mark a target point to be surveyed.

For surveying points, surveying apparatuses of the generic type comprise a targeting unit or beam directing unit. The latter is generally rotatable about a vertical axis and about a horizontal tilting axis relative to a base of the measuring apparatus, such that, by means of pivoting and tilting, measurement radiation emitted by the beam directing unit can be aligned with a point to be surveyed. The position of the target point is thus measured on the basis of the orientation—determined by means of goniometers—of the beam directing unit and/or the emission direction of the measurement radiation and the distance to the target, said distance being determined on the basis of the measurement radiation, e.g. according to the time-of-flight or phase measurement principle.

As an alternative or in addition to the surveying of individual points, a multiplicity of points are surveyed, for example by means of a scan with millions of point surveys, as a result of which a so-called 3D point cloud is generated. In this case, for completely surveying an object, that is to say for generating a 3D point cloud that images the surface of the object without gaps, it is often necessary to survey the object from a plurality of stations. The point clouds thus generated from two or more locations have to be related to a common base (so-called registration), which is complex and often can only be done afterward.

In order to link different stations or to support the registration of a plurality of point clouds, it is known to use visual odometry to ascertain the differences in position and orientation of two stations in a measurement environment. For this purpose, the surveying apparatus comprises a standard camera which, upon a change of station, continuously records a series of images, from which algorithmically, e.g. with the aid of a so-called SLAM (simultaneous localization and mapping) or SfM (structure from motion) algorithm. Such methods are also used independently of point cloud registration in order to ascertain the position and/or orientation of a surveying apparatus or to track movements of a surveying apparatus within a measurement environment.

What is problematic here is that the image quality of conventional cameras is greatly impaired by photometric effects such as high dynamic range or motion blur, particularly in weakly illuminated measurement environments such as tunnels or the interior of buildings. Owing to inadequate image quality, a visual odometry algorithm does not succeed in ascertaining the apparatus poses correctly or with sufficient accuracy. Further impediments of the odometry measurement quality result from excessive illumination (e.g. strong sunshine), rapid or great changes in illumination and rapid or non-uniform image scene changes (in some instances within a few seconds or even faster), which often occur e.g. in the open and when the surveying apparatus is moved from one location to another by a human being.

Particularly for surveying individual targets, surveying apparatuses, primarily laser trackers or total stations, can be configured for automatic target sighting/fine targeting and target tracking, abbreviated hereinafter to ATR (Automatic Target Recognition). A description of such an ATR system may be found e.g. in the publication by Kirschner, H. and Stempfhuber, W.: The Kinematic Potential of Modern Tracking Total Stations—A State of the Art Report on the Leica TPS1200+. 1st International Conference on Machine Control & Guidance 2008.

The ATR systems according to the prior art comprise means for emitting an illumination beam and for capturing at least part of that portion of the illumination beam which is reflected back from a target, e.g. a point in the environment or a reflective prism, by means of an ATR camera. Alternatively, such target radiation is emitted by the target itself by means of a beam source fitted to the target. The light reflected or emitted by the target is imaged as a light spot on a photosensor, e.g. a CMOS 2D chip.

The position or location of the light spot provides information about the direction to the target. Depending on the deviation of the orientation of the optical targeting axis of the camera from the direction to the target, the impingement position of the reflected radiation on the ATR sensor here also deviates from a central sensor area position, that is to say that the light spot of the ATR target radiation emanating from the target on the ATR area sensor does not lie at the center of the ATR area sensor and thus does not impinge on a desired position which was defined e.g. on the basis of calibration as that position which corresponds to the optical target axis. Consequently, the direction of the target relative to the optical targeting axis is deduced in the context of a fine targeting function on the basis of the location of the reflection spot or the exposed pixels on the image sensor.

In the case of a deviation, by means of the fine targeting function, usually in a motorized manner, the orientation of the targeting unit or beam directing unit is readjusted slightly in such a way that the ATR measurement beam retroreflected at the prism impinges highly precisely at the center of the sensor area on the ATR area sensor, that is to say that the horizontal and vertical angles of the sighting device are iteratively changed and adapted in this way until the center of the reflection spot coincides with the desired position on the ATR area sensor.

Besides the ATR fine tracking functionality, in a similar manner and using the same ATR components, an automatic target tracking functionality can also be provided, as is the case primarily for laser trackers, but also for modern total stations. During target tracking, the position of a moving target is determined continuously or at very small time intervals. The measurement/surveying apparatus follows the displacement of the target. The sighting device is thus tracked to movements of the target "live" and appropriately rapidly in such a way that the center of the ATR reflection spot still remains as accurately as possible and always on the desired position on the ATR area sensor. The jargon then often mentions "locking" onto the target or that the target is "locked on".

In order to ensure the functioning of automatic fine targeting or automatic tracking, it is necessary, before the function starts, to align the sighting device with the target at least approximately in such a way that target radiation is able to be received by the ATR camera or impinges on the ATR area sensor. If there is more than one possible target situated in the measurement environment, there is the problem here of selecting the target actually desired and of avoiding incorrect alignment with an undesired target. The prior art discloses solutions for identifying a target, e.g. by means of a barcode on the target, which barcode is imaged by means of an overview camera and read out.

What is disadvantageous about such known target identification means, however, is that secure read-out of the barcode ranges from complex to impossible particularly in the case of relatively large distances.

As a further method for target identification it is known to equip the target with a plurality of LEDs which emit a temporally variable light pattern. This light pattern is imaged by an image sensor of a position-sensitive detector (PSD) and compared with a stored pattern. What is disadvantageous about this solution is, firstly, the additional outlay on illuminants and, secondly, the complex image evaluation of the image provided by the image sensor. Above all, with this method it is not possible, or is possible only with high outlay/complexity, to keep a plurality of imaged targets or target patterns apart from one another and to eliminate or to mask out disturbance influences resulting from extraneous light sources or extraneous reflections.

In this case, extraneous light influences may not only hamper or prevent the detection or identification of the target, but also have the effect that the extraneous light source or the reflection thereof is locked on incorrectly instead of the target. Such extraneous reflections are caused by extraneous light or radiation sources such as direct insolation or indirect insolation, that is to say insolation reflected from road signs or glass surfaces, or headlights of construction vehicles. Disturbances are problematic particularly during target tracking since they often result in the loss of the locking onto the target reflection, which necessitates time-consuming renewed locking on.

WO 1997/10517 A1 discloses a target identification method with modulation of the polarization of the emitted light. What is disadvantageous here is the additional outlay for polarization, inter alia in the form of polarization means, which moreover have to be arranged at least in part at the target reflector, with the result that conventional retroflectors cannot be used. WO 2011/098131 uses an apparatus comprising two differently arranged radiation sources and at least two image sensors, wherein reflections are differentiated on the basis of the signals of the image sensors upon illumination with reflected light of the first radiation source and the signals upon illumination with reflected light of the second radiation source. Here, too, what is disadvantageous once again is the additional outlay on means, this time in the form of the additional light source and image sensors.

A further problem is present if the target moves jerkily and rapidly in such a way that it disappears from the field of view of the ATR detector (i.e. ATR measurement radiation reflected at the target no longer impinges on the ATR area sensor). The target still recorded in an image is already outside the field of view of the camera during the subsequent recording of a further image, with the result that said further image no longer contains a light spot of the target radiation. Since the exposure duration or the time interval between two image recordings is not arbitrarily shortenable—i.e. on account of the downwardly limit frame rate or frame frequency of the ATR cameras of the prior art—this problem occurs primarily in the case of very rapidly moving targets and/or at close range.

SUMMARY

It is therefore an object some aspect of the present invention to provide a surveying apparatus and a surveying method having improved automatic fine targeting and target tracking functionality.

A further object of some aspect of the present invention is to provide a surveying apparatus and a surveying method having improved target identification.

A further object of some aspect of the present invention is to provide an improved surveying apparatus and method enabling the position and/or orientation and/or the alteration thereof of the surveying apparatus to be determined by means of visual odometry.

These objects are achieved by the realization of the characterizing features of the independent claims. Features which develop the invention in an alternative or advantageous manner can be gathered from the dependent patent claims and also the description including the descriptions of the figures. All embodiments of the invention that are illustrated or otherwise disclosed in this specification are combinable with one another, unless expressly stated otherwise.

In accordance with a first aspect, the invention relates to a surveying apparatus, e.g. configured as a total station, a theodolite or a tachymeter or a laser tracker, configured for determining the position of a target with reference to an internal coordinate system, comprising a camera comprising a position-sensitive pixel array sensor for receiving and for detecting optical target radiation retroreflected or emitted by the target, wherein a direction to the target is determinable on the basis of an ascertained position of the detected target radiation on the pixel array.

The camera is configured as an event-based camera, such that for a respective pixel of the pixel array an event is detectable as a change in received light or radiation intensity. Optionally, in this case, a change in brightness is detected as an event if it exceeds a specific intensity threshold value, i.e. e.g. detected target radiation changes at least by a defined value.

Optionally, the surveying apparatus is configured to determine a distance to the target on the basis of a phase difference and/or time of flight of the detected target radiation ascertained by means of the sensor. By way of example, a rough or approximate distance to the target in comparison with the final or actual position determination is thus ascertained on the basis of the target radiation detected by means of the event-based camera.

In one preferred development, the surveying apparatus has an identification functionality, upon the implementation of which target radiation and hence the target is identified on the basis of a checking criterion. By way of example, an identification is carried out by checking a sequence of detected events for correspondence to a stored event sequence and/or associated with an event sequence class. By way of example, an intensity modulation of the target radiation, which is detected by means of the event detection (e.g. a modulation that changes between threshold-value-exceeding and threshold-value-undershooting intensity), is compared with a previously known modulation pattern, such that target radiation is differentiated from ambient radiation and/or target radiation of different targets.

Optionally, the sensor is configured as a dynamic vision sensor (DVS) and/or for an event detection rate or measurement rate of at least 1 kHz and/or the sensor covers a field of view of at least 1.5°, for example 20°, in particular at least 180°.

Optionally, the surveying apparatus comprises a base and also a beam directing unit for emitting a measurement radiation, in particular laser radiation, and for receiving at least part of the measurement radiation reflected at the target, wherein the beam directing unit is pivotable in a motorized manner about two axes relative to the base and a target axis is defined by an emission direction of the measurement radiation. Furthermore, in this option, the apparatus comprises a fine distance measuring unit for determining the distance to the target by means of the measurement radiation, and also an angle measuring functionality for determining an orientation of the beam directing unit relative to the base (orientation of the target axis), such that the target position sought is ascertainable on the basis of the determined distance and orientation. On the basis of the direction to the target determined by means of the sensor, the beam directing unit is pivotable in such a way that emitted measurement radiation impinges centrally on the target. In this case, as a further option, the beam directing unit comprises a target radiation source for emitting the target radiation, i.e. the target is illuminated with target radiation by the surveying apparatus.

Some aspects of invention additionally relate to a method for determining a direction to a target, wherein the method includes receiving modulated optical target radiation retroreflected or emitted by the target by means of an event-based camera of a surveying apparatus (e.g. of a total station or a laser tracker), wherein the camera comprises a position-sensitive sensor comprising a pixel array, said sensor being configured for example as a dynamic vision sensor, and detecting events as changes in a received radiation intensity by means of the pixel array, said changes in particular exceeding a defined threshold value.

Preferably, the method furthermore includes identifying the target radiation or the target on the basis of detected events caused by a modulation of the target radiation, and determining the direction to the target by means of ascertaining a position of the detected target radiation on the pixel array. In this case, modulation is understood broadly and e.g. also encompasses a (targeted) alteration of the direction of propagation of the target radiation.

In one development, the modulation is carried out upon the target radiation being emitted, for example by pulsed target radiation being generated, and/or the modulating is carried out upon the target radiation being reflected by the target, for example by at times interrupting the reflecting, specifically by means of a shutter of the target, and/or altering the target radiation direction, e.g. pivoting the target in a targeted manner, thus giving rise to a movement/direction pattern. Such a pivoting pattern as a form of the target radiation modulation can be produced not only with a reflective target but also with a self-luminous target.

Optionally, checking for correspondence to a stored event sequence and/or association with an event sequence class is carried out for the purpose of identifying the target radiation. By way of example, a detected event sequence is compared with a previously known pattern representing the modulation.

As a further option, a distance to the target is estimated by means of determining a phase difference and/or time of flight of the target radiation detected by the sensor.

In a further development, for determining the position on the pixel array an image of at least one light spot representing the target radiation is generated by means of integrating detected events with respect to time and by capturing pixel by pixel the detected events of the target radiation that have been integrated with respect to time, wherein e.g. a center of the light spot is determined as the position. In this case, the integrating is optionally already carried out at the (evaluation) level of the sensor, rather than this not being done until in an evaluation stage connected downstream of the sensor. An intensity image is read out in the case of this option.

As an option, the method involves, by means of constantly ascertaining the direction, target tracking of a moving target and altering an orientation of the event-based camera on the basis of the ascertained direction, in particular wherein estimating the velocity of the target is carried out in the context of the target tracking.

Optionally, the method involves determining an orientation (relative orientation) of a measurement auxiliary instrument, having a plurality of targets arranged in a fixed position in relation to one another, on the basis of the detected positions of the respective target radiation of the individual targets of the measurement auxiliary instrument.

An alternative method for determining a direction to a target involves moving or pivoting the target in accordance with a predefined movement pattern, receiving light emanating from the target by means of an event-based camera of a surveying apparatus, e.g. a total station, a theodolite or tachymeter or a laser tracker, wherein the camera comprises a position-sensitive sensor comprising a pixel array, detecting events as changes in received light intensity, said changes in particular exceeding a defined threshold value, by means of the pixel array, identifying the target on the basis of events which correspond to light intensity changes caused by the predefined movement pattern of the target, and determining the direction to the target by means of ascertaining a position of the detected movement pattern events on the pixel array.

In accordance with this alternative method, therefore, a target identification is carried out with events based on light variation which are caused by unambiguously determined target movement in accordance with a known pattern. In this case, e.g. the normal ambient light serves as a light source, said light being specularly reflected or scattered by the target in the direction of the camera. Consequently, a separate target radiation can be dispensed with in the case of this alternative.

In a further aspect, the invention relates to a mobile surveying apparatus comprising at least one camera module and a computer with visual odometry functionality, upon the implementation of which by means of a stored, in particular SLAM- or SfM-based, algorithm for visual odometry a series of images recorded by the camera module in various camera poses during a movement of the surveying apparatus along a path in a measurement environment are evaluated in such a way that at least one portion of the camera poses is determined.

The camera module comprises a dynamic vision sensor (DVS), such that for a respective pixel of a pixel array of the dynamic vision sensor an event is detectable as a change in received light intensity, said change in particular exceeding a defined threshold value. Furthermore, in the context of the functionality, during the movement, in addition to the recording of the series of images, events are detected and by means of the algorithm camera poses are determined using detected events. Camera poses are thus ascertained on the basis of the evaluation of camera images and detected events.

Optionally, the dynamic vision sensor is also configured and provided for recording the images in the context of the functionality, that is to say that it thus serves for dual use for event detection and for recording the series of images.

In one development, in the context of the functionality by means of the algorithm based on an SLAM or SfM evaluation on the basis of detected events (either solely by means of detected events or with detected events as an additional data source), identifying a multiplicity of corresponding image points in respective subgroups of the series of images is carried out and, on the basis of backsight and foresight procedures on the basis of the respective corresponding image points, the camera poses are determined.

Optionally, in the context of the functionality a first image of the series of images is recorded as reference image, the pose of which relative to/in relation to the measurement environment is known, a set of reference image points which occur in the reference image and at least one further image of the series of images is created on the basis of detected events, and determining camera poses relative to the measurement environment is carried out on the basis of the set of reference image points.

As a further option, in the context of the functionality a bundle adjustment is carried out using detected events. In one development, in the context of the functionality, tracking of image features (feature tracking) in images of the series of images is carried out, wherein the tracking of image features is carried out on the basis of detected events. As a further option, in the context of the functionality, a movement variable (e.g. acceleration and/or velocity) of the camera module is ascertained on the basis of detected events.

Optionally, in the context of the functionality, determining a position and/or orientation of the surveying apparatus is carried out on the basis of at least one portion of the camera poses. The location determination is carried out e.g. directly or exclusively by means of the camera poses or the latter are used for improving accuracy or in an interpolating manner for bridging.

Optionally, in the context of the functionality recording a first 3D point cloud, in particular by means of laser scanning, and at least one first image of the series of images at a first path point is carried out, wherein the first 3D point cloud and the first image image at least partly overlapping segments of the measurement environment, with the result that the first 3D point cloud and the first image are able to be linked spatially on account of the overlap. Furthermore, the functionality involves recording a second 3D point cloud and at least one second image of the series of images at a second path point, wherein the second 3D point cloud and the second image image at least partly overlapping segments of the measurement environment. Finally, the functionality involves registering the first and second 3D point clouds relative to one another on the basis of the determined camera poses of at least the first and second images.

As an option, the surveying apparatus comprises a thermal image sensor, an inertial measurement unit and/or an electronic distance measuring device, and camera poses are determined in the context of the functionality using measurement data of the thermal image sensor, of the inertial measurement unit and/or of the electronic distance measuring device.

Optionally, in the context of the, recording the images is carried out at a frame rate and detecting events is carried out at a detection rate that is at least 100 times the magnitude of the frame rate As an option, the surveying apparatus is configured as a laser scanner, a total station, a theodolite or a tachymeter or a laser tracker and/or it comprises a base and also a beam directing unit for emitting a measurement radiation, in particular laser radiation, and for receiving at least part of the measurement radiation reflected at the target, wherein the beam directing unit is pivotable in a motorized manner about two axes relative to the base. In addition, the apparatus comprises a fine distance measuring unit for determining the distance to the target by means of the measurement radiation, and an angle measuring functionality for determining an orientation of the beam directing unit relative to the base, such that a target position is ascertainable on the basis of the determined distance and orientation. As a further option, in this case, the surveying apparatus is configured for implementing the above-described method for determining a direction to a target.

Alternatively, the surveying apparatus is configured as a surveying rod, in particular with a GNSS receiver. For example, terrain points to be surveyed or marked out are contacted with such surveying rods.

Furthermore, in accordance with the second aspect, the invention relates to a method for visual odometry with a mobile surveying apparatus, in particular a laser scanner, a total station, a theodolite or a tachymeter, a laser tracker or a surveying rod, wherein the method involves moving the surveying apparatus along a path, and recording a series of camera images by means of the surveying apparatus during the movement in various camera poses, and determining at least one portion of the camera poses, which represent the position and orientation of the camera, on the basis of at least one portion of the camera images of the series of images.

Furthermore, the method involves detecting events by means of a dynamic vision sensor of the surveying apparatus, wherein an event is a change in light intensity received by means of the dynamic vision sensor, said change in particular exceeding a defined threshold value, using at least one portion of the detected events for determining the camera poses.

In addition, some aspects of the invention relate to a computer program product comprising program code stored on a machine-readable carrier, in particular of a surveying apparatus according to the invention, or computer data signal for carrying out a respective or all of the methods according to the invention.

The surveying apparatuses according to the invention and the methods according to the invention are described in greater detail below on the basis of embodiments and application processes illustrated schematically in the drawings.

BRIEF DESCRIPTION OF THE DRAWINGS

Specifically.

DETAILED DESCRIPTION

Figure 1:
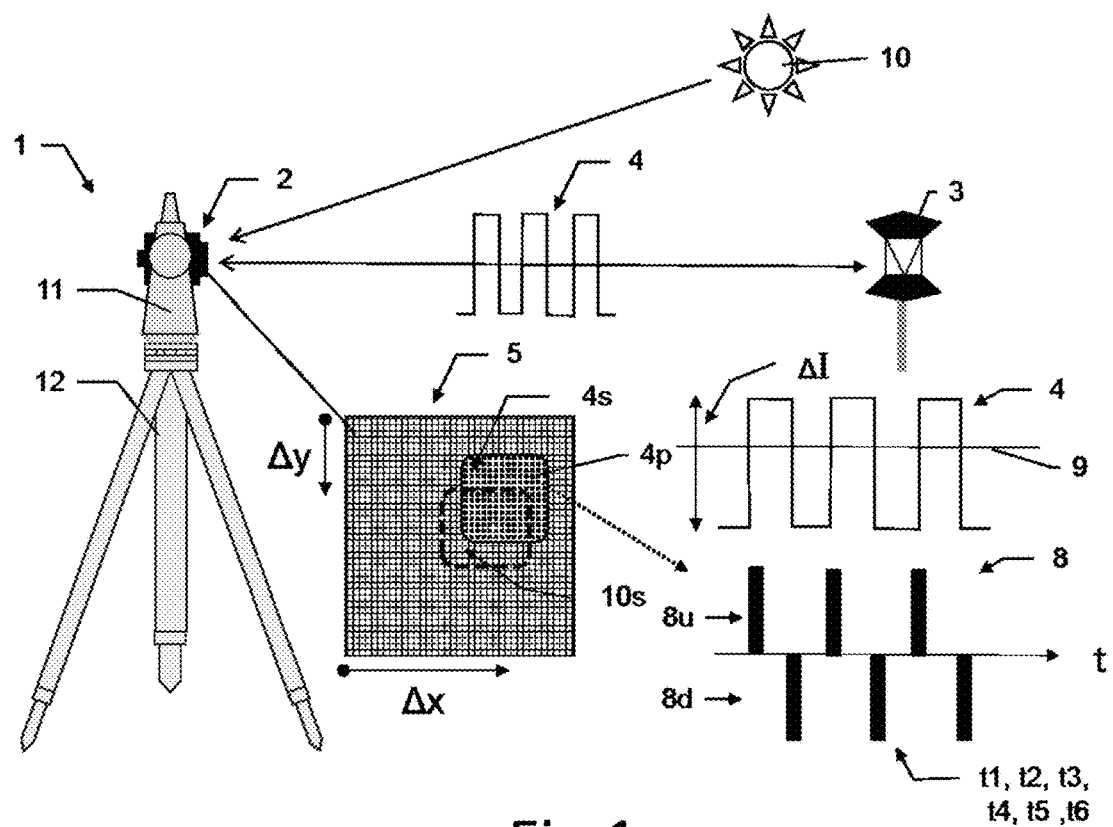
FIG. 1 schematically shows a surveying apparatus according to the invention and a target illuminated by said surveying apparatus.

FIG. 1 shows an exemplary surveying apparatus 1, for example configured as an automated total station or laser tracker, by means of which a position of a target 3 is determinable, e.g. by a laser source (not illustrated) as first beam source emitting a measurement beam toward the target 3, as a result of which a distance to the target 3 is determinable e.g. according to the time-of-flight method, with the result that, given a known or measured emission direction, the coordinates of the target 3 are determinable relative to the internal reference system of the surveying apparatus 1.

The surveying apparatus 1 comprises a control and evaluation unit (not illustrated) and a targeting device or beam directing unit 11 pivotable about two axes relative to a base 12 and comprising an objective unit, for example a telescopic sight or a telescope, and an ATR camera aligned with the target 3. However, capturing the target radiation as described below does not per se necessitate pivoting the targeting device 11 or the camera. The target object 3 is configured for example as a reflector, in particular as a reflective prism.

The surveying apparatus 1 is equipped with a second beam source, e.g. a laser light or IR source, for emitting a modulated—in the example pulsed—target illumination beam 4 toward the reflector 3, from where the target radiation 4 is reflected back in the direction of the target camera 2 and is received by the latter (assuming, of course, that the target 3 is situated in the field of view of the camera 2). Alternatively, the target 3 itself comprises a light source (not illustrated) that emits such modulated target radiation 4 that is able to be received by the camera 2. The camera 2 is equipped with a spatially resolving detector or photosensitive sensor. In this case, surveying apparatus 1 or camera 2 and target 3 can both be at rest (the case of a moving target 3 is described in detail further below in association with FIG. 4).

The camera 2 is configured as an event-based camera (event camera), comprising a dynamic vision sensor 5 (DVS) as detector, which is illustrated in an enlarged view next to the apparatus 1 in FIG. 1. Said sensor 5 comprises a pixel array (symbolized by the grid pattern), wherein for each pixel a change $\Delta I$ in the light intensity impinging on this pixel is registered as soon as this change $\Delta I$ exceeds a defined threshold value 9.

In the example, such intensity changes $\Delta I$ are triggered (constantly) by the reflected target illumination beam 4 since the target radiation 4 is pulsed. The target radiation pulses 4 are thus detected as events 8. In this case, the measurement rate of the sensor 5, with a frequency in the kilohertz range, e.g. 5 or 10 kHz, is advantageously high enough that the individual light pulses can be followed, that is to say that the pulses 4 are resolvable in each case as an event 8. To put it more precisely, as evident in the example, a respective pulse is even resolved as two events $8u$, $8d$. In other words, double information can be gathered from an individual pulse by means of the sensor 5 according to the invention, with the result that a pulse rate of half the magnitude is sufficient e.g. for a desired temporal resolution.

As an alternative (not illustrated), intensity changes $\Delta I$ that are detectable as an event and enable target identification are produced by the target 3 performing an exemplary movement that leads to a defined light modulation on the pixel array. By way of example, the target 3 comprises one or more target radiation sources that are moved in accordance with a defined pattern, with the result that, on account of the position changes, intensity changes (e.g. light modulation in the form of light shifts) take place on the pixel array, which are detectable as events by the sensor 5.

A further alternative involves triggering previously known intensity changes on the pixel array by means of ambient light as a result of a defined movement of the target 3. By way of example, the target 3 is configured as a bright or specularly reflective disk and is pivoted in a movement pattern by a user, with the result that the sensor 5 thereby detects events whose temporal and spatial profile are unambiguously assignable to the target 3.

In the example, target radiation 4 impinges on a region $4s$ of the pixel array. At all pixels located within said region $4s$, the modulated target radiation 4 is thus detected as events 8. This is illustrated by way of example for one pixel $4p$. In a manner corresponding to the intensity change $\Delta I$ that in each case exceeds a threshold value 9 (illustrated only in terms of absolute value in the figure for the sake of simplicity), events 8 are output for said pixel $4p$. In the example, said events are additionally provided with their respective event instant t1, t2, . . . or t6 and also with the type of change, that is to say differentiated according to events $8u$ of ascending intensity (positive change) and events $8d$ of descending intensity (negative change). Polarity, instant and address (pixel coordinate) of the brightness change are thus established as event. Optionally, a different threshold value can be defined here for each polarity.

In contrast to the event-triggering pulsed target radiation 4, extraneous radiation that is emitted continuously by a luminous object 10 (e.g. the sun) in the example is not detected. In the example, this non-target light does indeed impinge on a region $10s$ of the sensor 5. However, since this is associated with no intensity changes (or only intensity changes that are so slight that they lie below the threshold value 9), no output or detection signal whatsoever is generated by the sensor 5 on account of this undesired radiation 10, that is to say that the extraneous radiation is not captured by sensor means.

The event-based camera used or the light registration method used thus advantageously makes it possible to eliminate extraneous light influences from the outset. The latter are not just sorted out from the detections (as it were retrospectively) according to conventional methods, but rather are not detected in the first place. In contrast thereto, target radiation 4 is advantageously separated from disturbance influences, and target radiation 4 is captured on account of its intensity modulation, without this necessitating any further measures.

As further advantages, in contrast to conventional surveying apparatus cameras, the event-based camera 2 has a significantly reduced amount of data (since complete images are not constantly recorded, rather only possible changes are registered, or there is no need for complete images to be processed, but rather only individual pixels) and also a significantly reduced power consumption. The lower signal processing demand or data output and lower power demand is important primarily in the case of the mobile (and thus battery-operated) surveying apparatuses 1 of the generic type, such as laser trackers or total stations, which usually have limited potential with regard to data processing and transfer.

For determining the position of the target radiation 4 on the sensor 5—and thus the direction from the surveying apparatus 2 to the target 3 or a deviation of the alignment of the apparatus 2 from an ideal alignment with the target 3—the events 8 are integrated over a specific time period. It is thus possible to determine e.g. the distance $\Delta y$ and $\Delta x$ from a sensor zero point (in the example, the zero point is the top left corner of the pixel array), with the result that the orientation of the camera 2 or of a target axis of the surveying apparatus 2 can be altered in accordance with the distance $\Delta y$, $\Delta x$ in order that the target radiation 4 impinges centrally on the zero point. In the case of a moving target 3, target tracking can thus be carried out in a manner known per se.

As an alternative to event integration, the sensor 5 is configured also to determine (absolute) intensity values besides the intensity changes or events 8. This can be carried out with a measurement rate of 30 Hz, for example, that is to say with a significantly lower measurement rate than the event measurement rate or with a significantly reduced measurement rate in comparison with the prior art, since the event-based detection provides for a sufficiently high temporal resolution, or even an increased temporal resolution in comparison with the prior art. On account of the intensity values, the target radiation 4 can thus be imaged as a geometric shape whose position indicates the impingement position sought, e.g. as the center of a circular light spot imaged.

Figure 2:
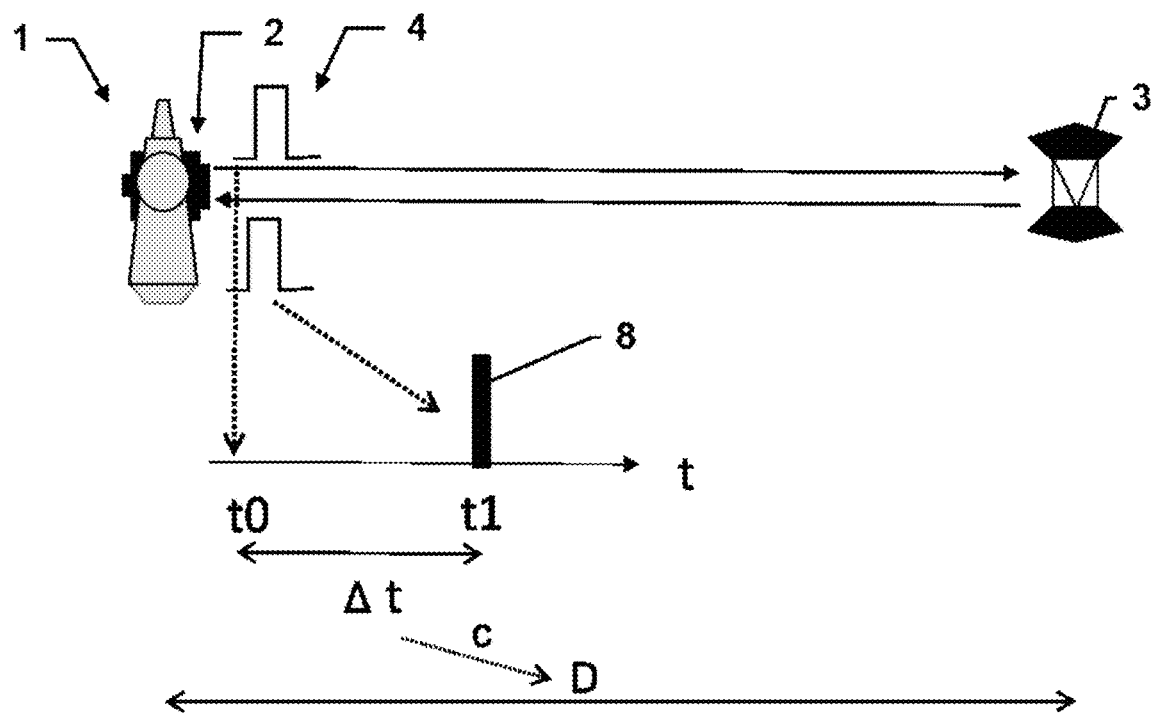
FIG. 2 shows one example of estimating a distance to the target.

FIG. 2 schematically shows how the comparatively high measurement rate of the event-based camera 2 or of the dynamic vision sensor 5 is advantageously utilized further. By means of the event-based camera 2—on account of its measurement frequency in the kilohertz range—it is possible not only to determine a direction to the target 3, but also to determine or to estimate a distance D to the target 4. In the example, this is done according to the time-of-flight principle known per se. A start time t0 is triggered when a target radiation pulse 4 is emitted, and a stop time t1 is triggered when the pulse 4 is detected as an event 8. With knowledge of the speed of light c, the distance D is roughly determinable from the time difference $\Delta t = t1-t0$. Alternatively or additionally, a distance estimation is carried out by determining a phase difference by means of the sensor 5.

With such a rough determination of the distance to the target, what can primarily be identified is whether the target 3 is situated in the near or far range of the measurement environment. This can be utilized e.g. automatically to set measurement parameters of the actual, highly accurate laser distance measurement, with the result that e.g. a target 3 in the far field is automatically surveyed with optimum parameters—for example of the distance measuring laser—for this measurement range.

Moreover, the robustness of the ATR target finding can thus be improved. This is because, besides disturbance light sources (see FIG. 1), a plurality of targets 3 in the measurement environment are also problematic if they are not differentiable for the surveying apparatus 1, for which reason inadvertent locking onto an incorrect, currently undesired target 3 can take place. By means of the distance estimation, at least targets 3 in the far field can be differentiated from those in the near field.

In order further to increase the robustness of the measurement in respect of target radiation 4, target radiation 4 is optionally identified to the effect that a check is made to establish whether the sequence of the events 8 satisfies a specific checking criterion. For example, a registered event sequence is compared with one or a plurality of stored event sequences. These stored sequences represent the modulation of the target radiation. If correspondence is established, the event sequence is identified as actually being caused by the target radiation 4. Otherwise the apparatus 1 carries on searching or outputs e.g. an error message.

As an alternative or additional checking criterion, the association with a class of events can be tested. A simple example of such a classification is the check as to whether the time intervals between the events 8 comply with a defined upper limit or a specific minimum event frequency, which represents the target radiation pulse rate in the example. A classification model for classifying detected events 8 as target radiation 4 or non-target radiation can e.g. also be formed by means of machine learning, assuming that the apparatus 1 is trained on target radiation 4 and non-target radiation. A self-learning classification model affords the advantage that even new target radiations 4 hitherto unknown to the surveying apparatus 1 can automatically be identified as such.

With such a target radiation identification, firstly it is possible to identify as such even disturbance light which, although it has a variable intensity above the threshold value and thus triggers events 8, does not correspond to the previously known checking criterion on account of its modulation which is different than the target radiation modulation.

Figure 3:
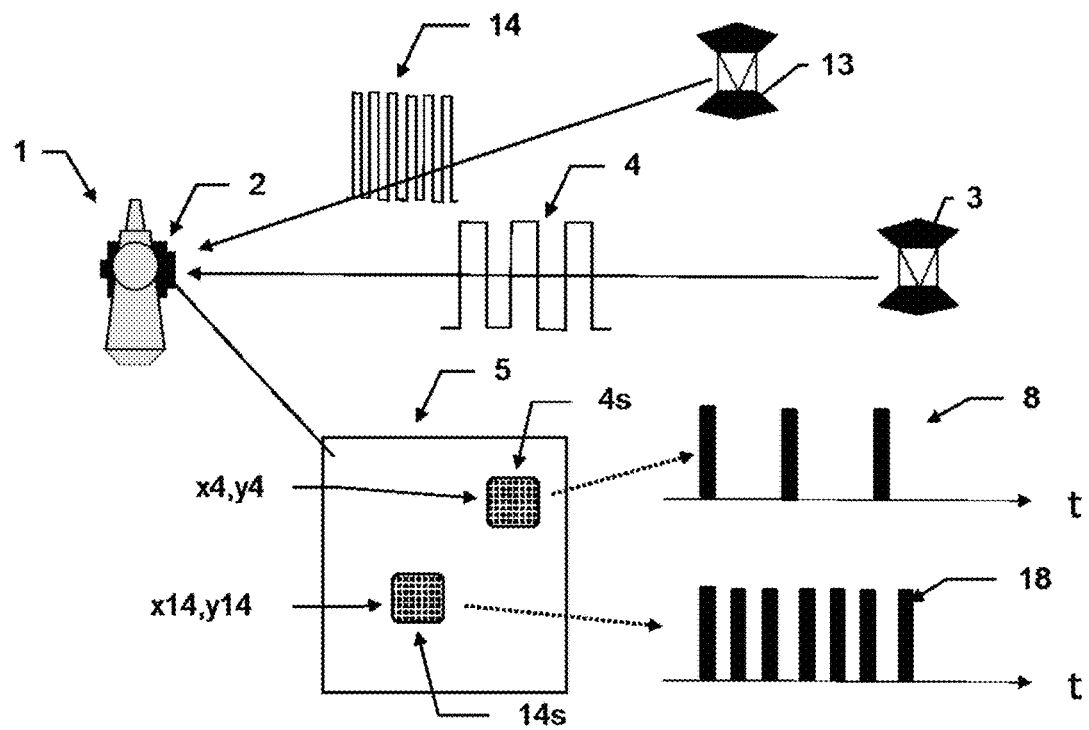
FIG. 3 shows one example of differentiating a plurality of targets.

As illustrated in FIG. 3, it is thus possible, moreover, also to identify different targets 3, 13 as such. The two targets 3 and 13 emit target radiation 4 and 14 with different pulse rates. Accordingly, different event sequences 8 and 18 are detected, with the result that the respective event sequence 8, 18 and thus the underlying radiation 4, 14 are identifiable therefrom—e.g. by means of a stored table in which a target 3, 13 is assigned to each event sequence. Consequently, e.g. a plurality of targets 3, 13 in the measurement environment can be surveyed in parallel, without a mix-up having to be feared.

In some embodiments, the target camera 2 and respectively the sensor 5 have a large field of view, up to 180° or more. This can remove the need for manual coarse alignment with a target 3, 13 or automatic coarse alignment, which is carried out in the prior art e.g. by means of a separate overview camera and is necessary primarily in the case of ATR cameras from the prior art which have a comparatively narrow field of view of e.g. 10° or less. A surveying apparatus according to the invention can thus be embodied without an overview camera.

Furthermore, identifiable target radiation 4, 14 is optionally used to determine the orientation or alignment of an, e.g. handheld, measurement auxiliary instrument used to mark target points of an object. One example of a handheld measurement auxiliary instrument having a measuring probe or a scanning attachment used in conjunction with a laser tracker is described in WO 2007/124010 A2 or is sold as "T probe" by Leica Geosystems AG. For this purpose, the measurement auxiliary instrument comprises a plurality of targets 3, 13 arranged fixedly at defined points on the instrument, e.g. in the shape of a T or X. On account of the individual target radiation 4, 14, which each of these targets 3, 13 arranged fixedly with respect to one another, each detection point 4s, 14s on the sensor 5 can be assigned to each target 3, 13 (for the sake of clarity in the illustration, the grid pattern symbolizing the pixel array at the sensor 5 is dispensed with in FIG. 3). From the relation of the positions x4,y4 and x14,y14 on the sensor, with knowledge of the position relations of the targets 3, 13 on the measurement auxiliary instrument, the orientation of the measurement auxiliary instrument relative to the camera 2 can be deduced. In addition, the detected position relation is optionally also evaluated in such a way that a rough distance to the measurement auxiliary instrument can be deduced.

On account of the comparatively high measurement rate, even fast rotational or pivoting movements—that is to say orientation changes—of such a measurement auxiliary instrument can be followed well and robustly, with the result that a survey of an object, e.g. by means of a surveying apparatus 1 configured as a laser tracker, can thus be carried out faster than with apparatuses from the prior art.

As an alternative to targets 3, 13 that emit differently modulated target radiation 4, 14, modulated and optionally also different target radiation 4, 14 is generated at reflective targets 3, 13, e.g. by a shutter being disposed upstream of the retroreflector. With such shutters, a target radiation emitted continuously by the surveying apparatus 1 can be introduced and masked out in a targeted manner (temporally controlled shading of the reflector), with the result that modulated target radiation and, with differently clocked shutters, different target radiations are thus realizable.

Alternatively or additionally, a modulation of the reflection direction is producible instead of such an intensity modulation e.g. by means of pivotable reflectors or by means of manual pivoting of the target 3, 13 (or of the surveying rod carrying the target). This results in a defined movement of the detection point, e.g. 4s, on the sensor (or else, in the case of very rapid pivoting, in a kind of pulsation of the target radiation), which is detectable by way of the pixel-by-pixel intensity change accompanying it. Such a direction change is possible e.g. by means of alternatively moving or rotating reflectors.

Figure 4:
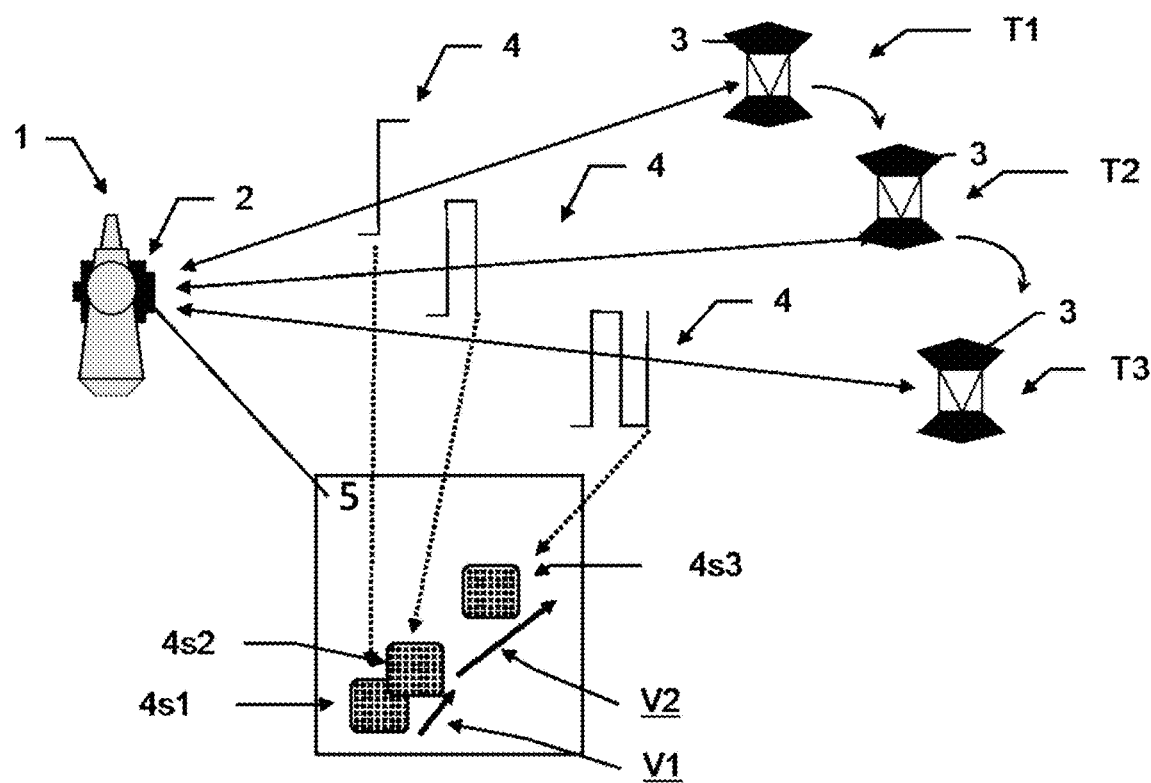
FIG. 4 shows one example of capturing a moving target.

FIG. 4 schematically shows one example of capturing a moving target 3. The target moves relative to the surveying apparatus 1, illustrated by the three locations at the three times T1, T2 and T3 in the figure. At the instant T1, a rising edge of a pulse of the target radiation 4 is present here, at the time T2 a falling edge is present, and at the time T3 once again a rising edge is present. These three intensity changes are registered by the sensor 5 respectively at points 4s1, 4s2 and 4s3 of the pixel array (in the example, it is assumed for the sake of simplicity that the camera 2 or the apparatus 1 does not follow or is not yet following the movement of the target 3).

On account of the high measurement rate of the sensor 5, paired with the fact that falling pulse edges are also registered as an event, that is to say that information is gathered twice from a respective radiation pulse, a highly dynamic representation of the movement of the target 3 is thus present. Target movements can thus be captured very much better than by apparatuses from the prior art, in which the target acquisition is lost in the case of very rapidly moving targets 3, primarily at close range, or in the case of abrupt movement changes, since the target 3 disappears from the field of view of the sensor 5 on account of the excessively sluggish target tracking.

For example, velocities V1, V2 describing the movement can be detected more rapidly and more precisely by means of the dynamic sensor 5. As symbolized by the different lengths of the velocity vectors V1, V2 in FIG. 4, even (sudden) movement changes can thus be detected well.

The system according to the invention thus provides improved target tracking having higher temporal resolution, by means of which even targets 3 which move relatively rapidly or suddenly change their movement can be reliably tracked, for which reason time-consuming renewed seeking of the target 3 (renewed lock-in) is obviated.

These can be improved even further by virtue of cameras 2 or sensors 5 with a having a relatively large field of view in comparison with conventional apparatuses, as already described further above. Determining the target movement or the tracking can additionally be supported further by virtue of the fact that the above-described distance estimation by means of the sensor 5 is concomitantly taken into account, that is to say that, e.g. with knowledge that the target 3 is at close range, higher displacement rates on the sensor 5 (higher angular frequency of the direction change) are assumed from the outset. In conjunction with the high measurement rate, what can thus be achieved is that tracking of the targeting direction always takes place sufficiently such that even a target 3 moving rapidly at close range practically never leaves the field of view of the camera 2 and a loss of lock-on thus no longer occurs.

Figure 5:
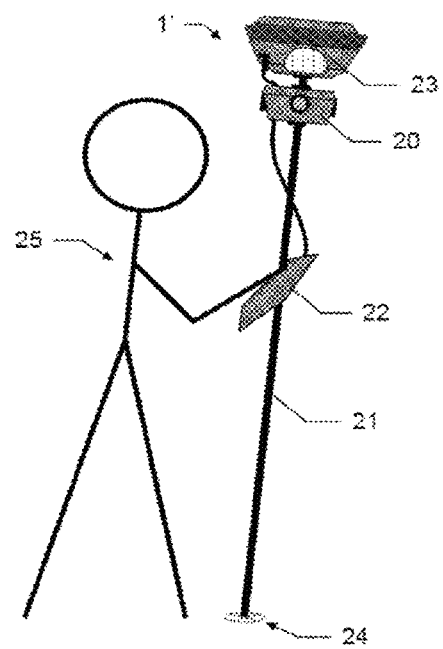
FIG. 5 shows one example of a further surveying apparatus, configured as a surveying rod.

FIG. 5 schematically shows a further surveying apparatus 1', which is configured as a surveying rod with a GNSS module 23 in the example. Such a surveying rod 1' guided by a user 25 can be used to survey or mark out measurement environment points 24 in a manner known per se by means of the rod 21 being positioned accordingly. The surveying apparatus 1' comprises a camera module 20 besides the GNSS module 23. Said camera module 20 comprises a dynamic vision sensor (DVS) besides an image sensor for recording conventional images, and so light intensity changes are thus also detectable as events. The GNSS pole 1' thus has an event-based camera like the apparatuses already presented above.

As an alternative to the abovementioned configuration with a conventional image sensor and an additional DVS, the surveying apparatus comprises a dynamic vision sensor which, besides event detection, can also capture intensity values (see also the description concerning FIG. 1), such that the camera images are also recordable by means of the DVS. The DVS then functions therefore as a dual sensor both for event detection and for taking photographs.

This event-based camera and the events thus detected are then used together with the camera images recorded in parallel in order to carry out visual odometry, in the example by means of the computer unit 22 of the surveying apparatus 1', in which computer unit a corresponding visual odometry algorithm is stored for this purpose. In other words, by means of visual odometry on the basis of the camera images and the data of the DVS, poses of the camera module 20 are ascertained, from which the position and orientation of the surveying apparatus 1' upon movement along a path are determinable. It is thus possible e.g. to support or refine the location determination (6-DoF) by means of GNSS or to carry out a location determination even at locations at which there is no GNSS reception, e.g. in tunnels or shadows cast by houses; this is possible, on account of the event-based camera 20, even under difficult lighting conditions (e.g. very bright or very dark) or upon rapid movement of the surveying apparatus 1'. The camera poses ascertained in this way are thus used for directly determining position and/or orientation, for improving accuracy and/or for interpolating bridging during the locating of the surveying apparatus 1'. The process for visual odometry is described in greater detail with reference to subsequent figures.

Figure 6:
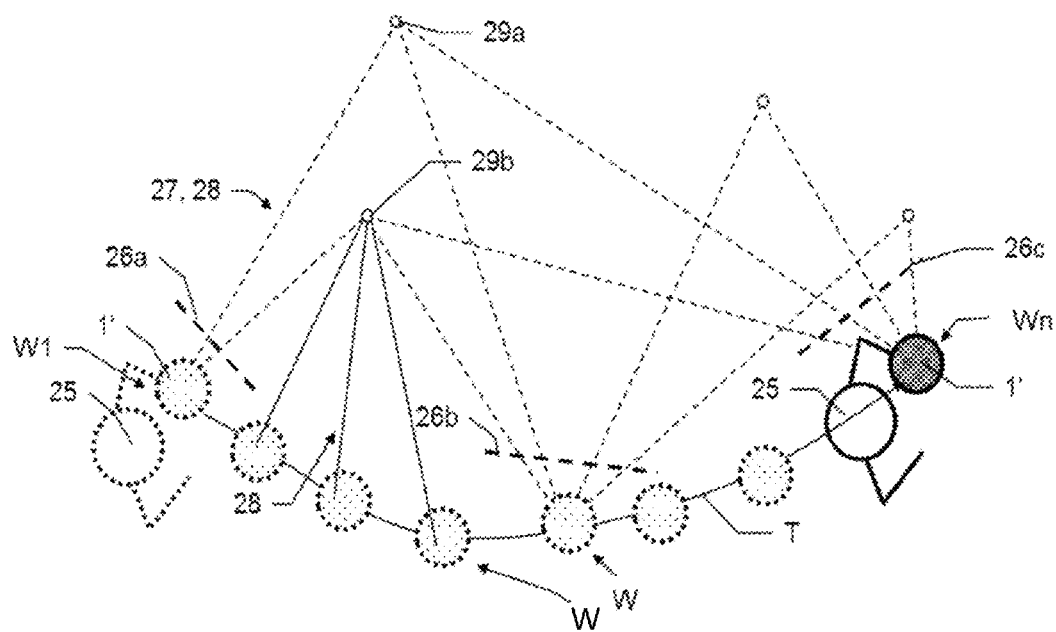
FIG. 6 shows one example of visual odometry by means of the surveying apparatus.

FIG. 6 shows, in a bird's eye view, how the surveying apparatus 1' is guided along a trajectory T from a start point S to an end point E by the user 25. At the start point W1, at the end point Wn and a further path point W, a camera image 26, 26b, 26c is respectively recorded by means of the camera module of the surveying rod 1'. By means of corresponding points, of which two 29a, 29b are designated in the figure, which occur in at least two of the images of the series of images 29a-29c, by means of a backsight procedure, indicated by the dashed lines 27, according to known geometric principles, for example using an SLAM algorithm (Simultaneous Localization and Mapping) or an SfM algorithm (Structure from Motion), the camera poses underlying the images 29a-29c are ascertainable in principle. By way of example, the two points 29a, 29b are such points which are identified in the image series subgroup 26a and 26b. Additional corresponding points for determining camera poses are able to be created e.g. by means of a foresight procedure. One disadvantage of such image-based methods is that image information of this type can be processed robustly only up to a certain degree, in view of limited computing power of a mobile surveying apparatus 1' of this type. In particular, fast (rotational) movements or fast scene changes can result in the termination of the reconstruction of the trajectory T.

The illustrated process of determining camera orientation and camera position is therefore carried out not solely on the basis of the camera images 26a-26c, but rather with the additional use of events detected by means of the DVS of the surveying apparatus 1'. For example, the displacement of the point 29b on the pixel array of the DVS is detected as such an event, said displacement being caused on account of the movement of the surveying apparatus 1'. The "travel" of the point 29b and thus its respective pixel position on the sensor can be tracked in this way. On the basis of this, additional measurement data are available for backsight and foresight procedures (indicated by the lines 28).

The detected events of the event-based camera are used in the example to make the identification of corresponding points 29a,b more robust or to refine the image-based determination of the camera poses. This is particularly advantageous if, on account of unfavorable lighting conditions or a fast trajectory T, which cause e.g. so-called high dynamic range effects or motion blur, evaluating the images 26a-26c or ascertaining homologous points 29a,b is possible only inaccurately or is not possible at all.

As illustrated in FIG. 6, the high event measurement rate of the event-based camera or the DVS (e.g. a plurality of kHz), said rate being e.g. a factor of 100 greater than the rate at which images 26a-26c are recorded, is used to track or to find corresponding points 29a,b between the images 26a-26c. At path points W between the image recording path points, only a few of which are illustrated in FIG. 6 for the sake of better clarity, detection of events is thus carried out in each case. These events are used to track or to continuously identify the points 29a,b behind them. This considerably facilitates or improves inter alia the process of finding them again or identifying them in the camera images 26a-26c. Moreover, it is thus possible to determine camera poses for path points W between the individual images 26a-26c. The detection of events can optionally also be used, without losses when determining the location of the surveying apparatus 1', to reduce the series of images in comparison with conventional apparatuses and methods, that is to say to record fewer images. The amount of data is thus advantageously reduced since camera images 26a-26c are data-intensive, whereas a DVS produces comparatively few data.

Optionally, in the context of the surveying apparatus functionality for visual odometry a first image 26a of the series of images 26a-26c is recorded as a reference image, with a known pose in relation to the measurement environment. That is to say that the image 26a is referenced in absolute terms (relative to an absolute reference system), for example, such that the points 29a, 29b created on the basis of detected events also serve as reference points. A set of such reference points or a reference point field then serves for determining an absolute camera pose of subsequent images 26b, 26c.

In other words, the image data of the images 26a-c are analyzed with regard to corresponding points, that is to say measurement environment points which are imaged in a plurality of images. This set of points forms a reference point field, which serves as a reference for further camera images 26b,c, as a result of which each further image 26b,c serve reference points for referencing the image 26b,c with regard to all previous images. In each new image 26b,c, image points corresponding thereto are identified, by means of or using detected events, for environment points of the reference point field already present. These image points found are used together with already ascertained coordinates of associated points for determining the camera pose of the new image 26b,c by means of a backsight procedure. Moreover, in the respective new image 26b,c, corresponding points are in turn identified, on the basis of or supported by measurement data of the DVS, which serve for ascertaining additional point coordinates by means of a foresight procedure, such that the reference point field is extended. Moreover, by means of such an SLAM evaluation, it is possible not just to ascertain camera poses but additionally to generate a 3D point cloud (sparse point cloud) of the measurement environment (the positions of all reference points), wherein, on account of the comparatively high measurement rate of the DVS and the easier processability of the measurement data thereof, it is possible to generate a denser point cloud than with the use of conventional means/methods without additional requirements in respect of the computing power.

As a further option, e.g. a final step involves refining the reference point field produced and the camera poses ascertained by means of bundle adjustment, wherein the bundle adjustment is carried out using detected events. By means of such a bundle adjustment, the positions and orientations of the camera poses and, if appropriate, of the 3D point coordinates ascertained in the course of the method are optimized; a global optimization is carried out which minimizes the reprojection errors in a typical SfM approach.

Figure 7:
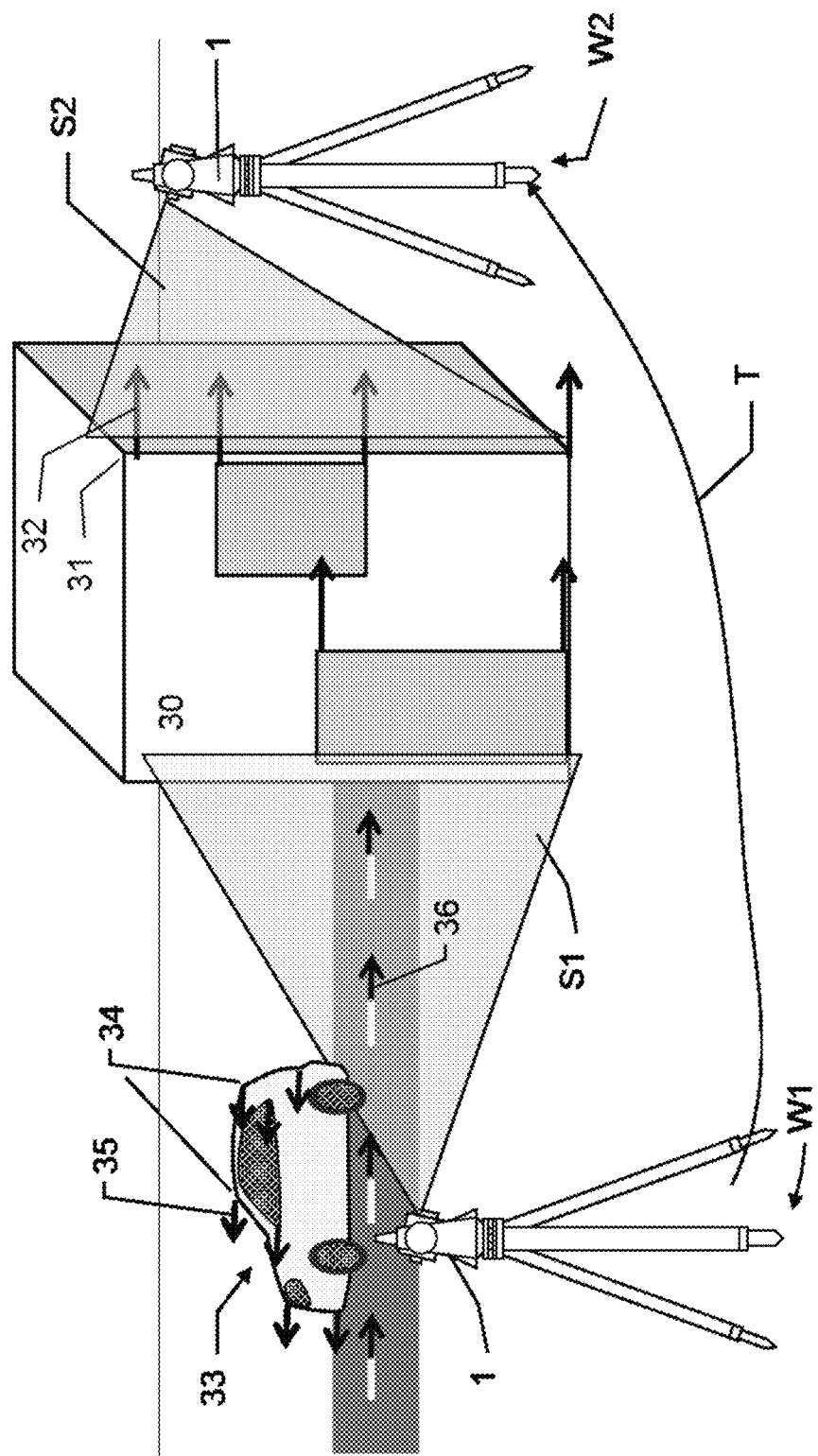
FIG. 7 shows a further exemplary application for an odometry method according to the invention.

FIG. 7 shows a further exemplary application for an odometry method according to the invention in a schematic side view. In the example, by means of a surveying apparatus 1, for example configured as described with regard to FIG. 1, from a first location W1 by means of a laser scan S1 a first 3D point cloud is recorded from part of the measurement environment, in the example a first part of the building 30. In order to scan further parts of the building 30, primarily those which are not scannable from the first location S1, the surveying apparatus 1 is transported along the path T to a second location W2 in order from there to create a further, second 3D point cloud by means of a second scan S2. In order to be able to represent the housing 30 in a single 3D form, the two 3D point clouds have to be registered, that is to say put into a common coordinate system.

This is done in the example, then, by a camera image being recorded from the respective location W1, W2 besides the scan S1, S2, said camera image respectively overlapping the scan S1, S2 or the first or second point cloud. During the movement T, events are constantly detected by means of the dynamic vision sensor of the surveying apparatus 1. On the basis of the camera images and the detected events, camera poses are ascertained and the position and orientation of the second 3D point cloud with respect to the first are finally ascertained as required. In the example, visual odometry using an event-based camera thus makes it possible to ascertain the pose difference between two scanning locations W1, W2 and thus to register the two point clouds.

In the example, determining camera posse or position and orientation is carried out by means of feature tracking, e.g. of the features 31, 34 and 36. This feature tracking is either based exclusively on detected events or the events serve to support the tracking of the features 31, 34, 36 in camera images of a series of images that are recorded by means of the surveying apparatus camera during the movement T, e.g. by virtue of the fact that the DVS measurement data can be taken as a basis for narrowly delimiting beforehand a target region in a subsequent image for the purpose of finding features. By way of example, matching algorithms such as SIFT, SURF, BRISK or BRIEF can be applied here.

The use of an event-based camera is advantageous for feature tracking, inter alia on account of the high measurement rate, but also because such features 31, 34 representing corners can thus be tracked particularly well. Corners 31, 34 are robustly detected as events even from different viewing directions, and so these can be tracked particularly well.

Moreover, with the DVS data, feature tracking can be carried out robustly even in the case of rapid relative movements of object features. On account of the high dynamic range of the DVS, even fast movements of the surveying apparatus and thus of the camera 1 or "movements" of features on the sensor or from image to image can be followed and do not result in a loss of features and thus inadequate or infeasible feature tracking, and thus ultimately of the visual odometry. Moreover, otherwise problematic movements of objects 33 in the measurement environment itself can be processed. In the example, the traveling automobile 33 is also captured by the camera. The measurement data of the DVS allow this intrinsic dynamic range of the object 33 to be identified. It is thus possible reliably to differentiate movements 32 of a feature 31 which are caused by the movement of the apparatus 1 from such movements 35 which are caused (additionally) by movement of an object 33.

Optionally, such movements 32 are quantified. In such a case, it is particularly advantageous to differentiate feature or point movements caused by the surveying apparatus 1 from those which are caused by object movements. A movement variable of the surveying apparatus 1 or of the camera module is the velocity or acceleration thereof, for example, which is ascertained on the basis of detected events.

As a further option, the surveying apparatus 1 has a thermal image sensor, an inertial measurement unit (IMU) or an electronic distance measuring device. These detectors or measuring units are then used to further support the determination of the camera poses. With their measurement data, for example of a thermographic representation of the environment, acceleration values or distance values, additional information about the measurement environment is present, which information e.g. makes feature tracking even more robust or facilitates assignments between images or detected events or makes them verifiable.

To summarize, therefore, the subject matter of the invention in accordance with a first aspect is embodied by the claims below.

What is claimed is:

1. A mobile surveying apparatus comprising:
at least one camera module; and
a computer having visual odometry functionality, upon the implementation of which by means of a stored algorithm for visual odometry camera poses are determined by means of the evaluation of a series of images recorded by the camera module in various camera poses during a movement of the surveying apparatus along a path in a measurement environment,
wherein the camera module comprises a dynamic vision sensor, such that for a respective pixel of a pixel array of the dynamic vision sensor an event is detectable as a change in received light intensity,
wherein in the context of the functionality, during the movement, in addition to the recording of the series of images, events are detected,
wherein by means of the algorithm camera poses are determined using detected events, and
wherein the dynamic vision sensor is configured for an event detection rate of at least 1 kHz,
wherein the surveying apparatus is configured as a laser scanner, a total station, a theodolite or a tachymeter or a laser tracker and comprises:
a base,
a beam directing unit for emitting a measurement radiation and for receiving at least part of the measurement radiation reflected at a target, wherein the beam directing unit is pivotable in a motorized manner about two axes relative to the base;
a fine distance measuring unit for determining the distance to the target by means of the measurement radiation; and
an angle measuring functionality for determining an orientation of the beam directing unit relative to the base,
wherein a target position is ascertainable on the basis of the determined distance and orientation.

2. The mobile surveying apparatus according to claim 1, wherein the dynamic vision sensor is also configured and provided for recording the images in the context of the functionality, or in the context of the functionality by means of the algorithm based on an SLAM or SfM evaluation on the basis of detected events, identifying a multiplicity of corresponding image points in respective subgroups of the series of images is carried out and, on the basis of backsight and foresight procedures on the basis of the respective corresponding image points, the camera poses are determined, or in the context of the functionality:
- a first image of the series of images is recorded as reference image, the pose of which relative to/in relation to the measurement environment is known,
- a set of reference image points which occur in the reference image and at least one further image of the series of images is created on the basis of detected events, and
- determining camera poses relative to the measurement environment is carried out on the basis of the set of reference image points.

3. The mobile surveying apparatus according to claim 1, wherein in the context of the functionality:
- a bundle adjustment is carried out using detected events, or
- tracking of image features in images of the series of images is carried out, wherein the tracking of image features is carried out on the basis of detected events.

4. The mobile surveying apparatus according to claim 1, wherein in the context of the functionality:
- a movement variable of the camera module is ascertained on the basis of detected events, or
- determining a position and/or orientation of the surveying apparatus is carried out on the basis of at least one portion of the camera poses, or in the context of the functionality:
- recording a first 3D point cloud, wherein the first 3D point cloud and the first image, at least partly overlapping segments of the measurement environment, and
- recording a second 3D point cloud and at least one second image of the series of images at a second path point, wherein the second 3D point cloud and the second image at least partly overlapping segments of the measurement environment, and
- registering the first and second 3D point clouds relative to one another on the basis of the determined camera poses of at least the first and second images.

5. The mobile surveying apparatus according to claim 1, wherein in the context of the functionality, recording the images is carried out at a frame rate and detecting events is carried out at a detection rate that is at least 100 times the magnitude of the frame rate, or the surveying apparatus comprises a thermal image sensor, an inertial measurement unit or an electronic distance measuring device, and camera poses are determined using measurement data of the thermal image sensor, of the inertial measurement unit or of the electronic distance measuring device.

6. A computer program product comprising program code stored on a non-transient machine-readable carrier of a surveying apparatus according to claim 1.

* * * * *